US011883848B2

(12) United States Patent
Funk et al.

(10) Patent No.: US 11,883,848 B2
(45) Date of Patent: Jan. 30, 2024

(54) CLASSIFICATION PROCESS FOR SUPERABSORBENT POLYMER PARTICLES

(71) Applicant: BASF SE, Ludwigshafen (DE)

(72) Inventors: Rüdiger Funk, Ludwigshafen (DE); Matthias Weismantel, Ludwigshafen (DE); Monte Alan Peterson, Freeport, TX (US); Patrick Neal Hamilton, Freeport, TX (US); Ronny De Kaey, Antwerp (BE); Karl Possemiers, Antwerp (BE)

(73) Assignee: BASF SE, Ludwigshafen (DE)

( * ) Notice: Subject to any disclaimer, the term of this patent is extended or adjusted under 35 U.S.C. 154(b) by 206 days.

(21) Appl. No.: 16/630,873

(22) PCT Filed: Jul. 20, 2018

(86) PCT No.: PCT/EP2018/069770
§ 371 (c)(1),
(2) Date: Jan. 14, 2020

(87) PCT Pub. No.: WO2019/025210
PCT Pub. Date: Feb. 7, 2019

(65) Prior Publication Data
US 2020/0147652 A1 May 14, 2020

(30) Foreign Application Priority Data
Jul. 31, 2017 (EP) .................................... 17183912

(51) Int. Cl.
*B07B 13/16* (2006.01)
*B01J 20/26* (2006.01)
*B07B 4/08* (2006.01)
*B07B 11/02* (2006.01)
*C08F 20/06* (2006.01)

(52) U.S. Cl.
CPC ............ *B07B 13/16* (2013.01); *B01J 20/261* (2013.01); *B07B 4/08* (2013.01); *B07B 11/02* (2013.01); *C08F 20/06* (2013.01); *B01J 2220/68* (2013.01); *B07B 2220/02* (2013.01)

(58) Field of Classification Search
CPC .......... B07B 4/08; B07B 11/02; B07B 13/16; B07B 2220/02; B01J 20/261; B01J 2220/68; C08F 20/06
See application file for complete search history.

(56) References Cited

U.S. PATENT DOCUMENTS

| 4,666,983 | A | 5/1987 | Tsubakimoto et al. |
| 4,734,478 | A | 3/1988 | Tsubakimoto et al. |
| 6,143,821 | A | 11/2000 | Houben |
| 6,239,230 | B1 | 5/2001 | Eckert et al. |
| 6,241,928 | B1 | 6/2001 | Hatsuda et al. |
| 6,472,478 | B1 | 10/2002 | Funk et al. |
| 6,503,979 | B1 | 1/2003 | Funk et al. |
| 6,559,239 | B1 | 5/2003 | Riegel et al. |
| 6,657,015 | B1 | 12/2003 | Riegel et al. |
| 7,652,111 | B2 | 1/2010 | Hermeling et al. |
| 7,687,596 | B2 | 3/2010 | Hermeling et al. |
| 7,754,822 | B2 | 7/2010 | Daniel et al. |
| 7,772,420 | B2 | 8/2010 | Hermeling et al. |
| 9,644,058 | B2 | 5/2017 | Matsumoto et al. |
| 2009/0261023 | A1 | 10/2009 | Stueven et al. |
| 2010/0101982 | A1* | 4/2010 | Konishi .................. C08J 3/122 209/3.1 |
| 2013/0066019 | A1* | 3/2013 | Okuda ............... G01N 15/0272 525/329.7 |
| 2016/0030979 | A1* | 2/2016 | Possemiers ............. C08L 33/02 209/233 |

FOREIGN PATENT DOCUMENTS

| DE | 3314019 A1 | 1/1984 |
| DE | 3523617 A1 | 1/1986 |
| DE | 3713601 A1 | 11/1988 |
| DE | 3825366 A1 | 2/1989 |
| DE | 4020780 C1 | 8/1991 |
| DE | 19543368 A1 | 5/1997 |
| DE | 19646484 A1 | 5/1997 |
| DE | 19807992 C1 | 7/1999 |
| DE | 19807502 A1 | 9/1999 |
| DE | 19854573 A1 | 5/2000 |
| DE | 19854574 A1 | 5/2000 |
| DE | 10204937 A1 | 8/2003 |
| DE | 10204938 A1 | 8/2003 |
| DE | 10331450 A1 | 1/2005 |
| DE | 10331456 A1 | 2/2005 |
| DE | 10334584 A1 | 2/2005 |
| DE | 10355401 A1 | 6/2005 |
| EP | 0083022 A2 | 7/1983 |
| EP | 0450922 A2 | 10/1991 |
| EP | 0530438 A1 | 3/1993 |
| EP | 0543303 A1 | 5/1993 |
| EP | 0547847 A1 | 6/1993 |
| EP | 0559476 A1 | 9/1993 |
| EP | 0632068 A1 | 1/1995 |
| EP | 0855232 A2 | 7/1998 |
| EP | 0937736 A2 | 8/1999 |
| EP | 1199327 A2 | 4/2002 |
| EP | 2253375 A1 | 11/2010 |
| EP | 2548910 A1 | 1/2013 |
| JP | 2015535866 A | 12/2015 |

(Continued)

OTHER PUBLICATIONS

Graham, et al., "Chapter 3—Commercial Processes for the Manufacture of Superabsorbent Polymers", Modern Superabsorbent Polymer Technology, ed. Buchholz, et al., 2nd Edition, 1998, pp. 69-117.

(Continued)

*Primary Examiner* — Joseph C Rodriguez
(74) *Attorney, Agent, or Firm* — MARSHALL, GERSTEIN & BORUN LLP

(57) ABSTRACT

The invention relates to a classification process for superabsorbent polymer particles, comprising classifying the water-absorbent polymer particles in a screen machine under reduced pressure wherein the pressure above the uppermost sieve is from 0 to 4.0 mbar per sieve higher than below the undermost sieve.

20 Claims, No Drawings

(56) References Cited

FOREIGN PATENT DOCUMENTS

| WO | WO-90/15830 A1 | 12/1990 |
|---|---|---|
| WO | WO-93/21237 A1 | 10/1993 |
| WO | WO-01/38402 A1 | 5/2001 |
| WO | WO-02/32962 A2 | 4/2002 |
| WO | WO-02/055469 A1 | 7/2002 |
| WO | WO-2003/031482 A1 | 4/2003 |
| WO | WO-2003/078378 A1 | 9/2003 |
| WO | WO-2003/104299 A1 | 12/2003 |
| WO | WO-2003/104300 A1 | 12/2003 |
| WO | WO-2003/104301 A1 | 12/2003 |
| WO | WO-2004/035514 A1 | 4/2004 |
| WO | WO-2006/074816 | 7/2006 |
| WO | WO-2008/037672 | 4/2008 |
| WO | WO-2008/037675 A1 | 4/2008 |
| WO | WO-2008/040715 A2 | 4/2008 |
| WO | WO-2008/052971 A1 | 5/2008 |
| WO | WO-2011/042429 A1 | 4/2011 |
| WO | WO-2014/021432 A1 | 2/2014 |
| WO | WO-2014044780 A1 | 3/2014 |
| WO | WO-2014/053295 | 4/2014 |

OTHER PUBLICATIONS

Wessel, "Sieben", Ullmanns Encyklopädie der technischen Chemie, Verfahrenstechnik I, Verlag Chemie, Weinheim/Bergstr, vol. 2, 1972, pp. 43-56.

Buccholz, F., et al. Modern Superabsorbent Polymer Technology, "Commercial Processes for the Manufacture of Superabsorbent Polymers." New York: John Wiley & Sons, Inc., 1998, pp. 71-103 and 89-92.

International Application No. PCT/EP2018/069770, International Search Report and Written Opinion, dated Oct. 19, 2018.

* cited by examiner

CLASSIFICATION PROCESS FOR SUPERABSORBENT POLYMER PARTICLES

CROSS-REFERENCE TO RELATED APPLICATIONS

This application is the U.S. National Stage application of International Patent Application No. PCT/EP2018/069770, filed Jul. 20, 2018, which claims the benefit of European Patent Application No. 17183912.9, filed Jul. 31, 2017.

The invention relates to a classification process for superabsorbent polymer particles, comprising classifying the water-absorbent polymer particles in a screen machine under reduced pressure wherein the pressure above the uppermost sieve is from 0 to 4.0 mbar per sieve higher than below the undermost sieve.

Superabsorbent polymer particles are used to produce diapers, tampons, sanitary napkins and other hygiene articles, but also as water-retaining agents. The superabsorbent polymer particles are often also referred to as "absorbent resins", "superabsorbents", "water-absorbent polymers", "absorbent polymers", "absorbent gelling materials", "hydrophilic polymers" or "hydrogels".

The production of superabsorbent polymers is described in the monograph "Modern Super-absorbent Polymer Technology", F. L. Buchholz and A. T. Graham, Wiley-VCH, 1998, pages 71 to 103.

As a product which absorb aqueous solutions, superabsorbent polymers are used for the production of diapers, tampons, sanitary napkins and other hygiene articles, but also as water-retaining agents in market gardening.

The properties of the superabsorbent polymers can be adjusted via the degree of crosslinking. With increasing degree of crosslinking, the gel strength rises and the centrifuge retention capacity (CRC) falls.

To improve the use properties, for example saline flow conductivity (SFC) in the diaper and absorbency under load (AUL), superabsorbent polymer particles are generally surface postcrosslinked. This increases only the degree of crosslinking of the particle surface, which allows absorbency under load (AUL) and centrifuge retention capacity (CRC) to be at least partly decoupled. This surface postcrosslinking can be performed in the aqueous gel phase. However, dried, ground and screened-off polymer particles (base polymer) are preferably coated on the surface with a surface postcrosslinker, dried and thermally surface postcrosslinked. Crosslinkers suitable for this purpose are compounds which comprise at least two groups which can form covalent bonds with the carboxylate groups of the polymer particles.

The superabsorbent polymer particles are used in the hygiene sector. Here, for example, particle sizes between 150 and 850 µm are used and the polymer particles are classified to these particle sizes actual in course of the production process. In this case, continuous screening machines with two screens are used, wherein the screens used the mesh sizes of 150 and 850 µm. Particles having a particle size of up to 150 µm fall through both screens and are collected as undersize (fines) at the bottom of the screening machine. Particles having a particle size of greater than 850 µm remain on the uppermost screen as oversize and are discharged. The product fraction having a particle size of 150 to 850 µm is removed as midsize between the two screens of the screening machine. Depending on the screening quality, each particle size fraction still comprises a proportion of particles with the wrong particle size as erroneous discharge. For example, the midsize fraction may also comprise a proportion of particles having a particle size of 150 µm or less.

Discharged undersize and oversize is typically recycled into the production. The undersize can be added, for example, to the polymerization. The oversize is typically comminuted, which inevitably also leads to the occurrence of further undersize.

In the conventional classifying operations, different problems occur when polymer particles are classified. The most frequent problem is the blockage of the screen surface and the deterioration in the classifying efficiency and the classifying ability. A further problem is the caking tendency of the product particles which leads to undesired agglomerates before, after and during the screening. The process step of screening therefore cannot be performed such that it is free of disruptions, often accompanied by unwanted shutdowns in production. Such disruptions are found to be particularly problematic in the continuous production process. The overall result is, however, insufficient separation efficiency in the screening.

A higher screening quality is typically achieved by adding substances to the product which serve to increase the free flow and/or the mechanical stability of the polymer particles. In general, a free-flowing product is achieved when assistants, for example surfactants, which prevent mutual adhesion of the individual particles, are added to the polymer particles, usually after the drying and/or in course of the surface postcrosslinking. In other cases, attempts are made to influence the caking tendencies by process technology measures.

To achieve higher separation efficiencies without further product additives, improvements by use of alternative screening units have been proposed. For instance, higher separation efficiencies are achieved when screen orifice areas are driven in spiral form. This is, for example, the case in tumbling screen machines. When, however, the throughput of such screening apparatus is increased, the above problems are enhanced, and it becomes even more impossible to maintain the high classifying capability.

The addition of screening aids such as screening balls, PVC friction rings, Teflon-friction rings or rubber cubes on the screen surface only helps insignificantly to improve the separation efficiency. Particularly in the case of abrasive polymer material, such as superabsorbent polymer particles, this can cause increased attrition.

A general overview of classification can be found, for example, in Ullmanns Encyklopädie der technischen Chemie, 4th edition, volume 2, pages 43 to 56, Verlag Chemie, Weinheim, 1972.

Some problems concerning classifying of superabsorbent polymer particles are mentioned in EP 0 855 232 A2, WO 2006/074816 A1, and WO 2008/037675 A1.

EP 0 855 232 A2 describes the use of thermally insulated and/or heated sieving devices.

WO 2006/074816 A1 describes a process for classifying of superabsorbent polymer particles under reduced pressure.

WO 2008/037675 A1 describes the use of additional sieves for improving the separation efficiency.

EP 2 253 375 A1 describes a process for producing of superabsorbent polymer performing one or more process steps under reduced pressure.

It is an object of the present invention to provide an improved classifying process for production of superabsorbent polymer particles.

This object is achieved by a classification process for superabsorbent polymer particles, wherein the water-absorbent polymer particles are classified by using a screen machine under reduced pressure and the pressure above the uppermost sieve is from 0 to 4.0 mbar per sieve higher than the pressure below the undermost sieve.

For example, the pressure above the uppermost sieve is 4 mbar below ambient pressure, the pressure below the undermost sieve 10 mbar below ambient pressure, and the number of screens in the screen machine is 3. In that example, the pressure above the uppermost sieve is from 2.0 mbar per sieve higher than the pressure below the undermost sieve The number of screens is preferably at least 2, more preferably at least 3, most preferably at least 4.

It is an essential feature of the present invention that the pressure above the uppermost sieve compared to the pressure below the undermost sieve is not too high. The pressure above the uppermost sieve is preferably from 0.05 to 3.5 mbar per sieve, more preferably from 0.1 to 3.0 mbar per sieve, most preferably from 0.25 to 2.5 mbar per sieve, higher than below the undermost sieve. The pressure difference per sieve is calculated by subtraction of the absolute pressure below the undermost sieve from the absolute pressure above the uppermost sieve divided by the number of sieves.

The pressure inside the screen machine is below ambient pressure (reduced pressure). The pressure above the uppermost sieve is preferably at least 0.5 mbar, more preferably at least 1 mbar, most preferably at least 2 mbar, below ambient pressure.

The invention is based on the finding that a high pressure drop over the sieves reduces the separation efficiency of the screen machine. May be that the tendency of particles that could not pass for sticking in the mesh increases with the pressure drop over the sieves.

The screening result may, especially at high throughputs, be improved further when the midsize (product fraction) is removed by means of at least two screens of different mesh sizes.

The screening result may, especially at high throughputs, be improved further when the oversize is removed by means of at least two screens of different mesh sizes.

In the process according to the invention, the screen fractions can be combined in different ways to give particle size fractions, for example in the sequence (2,1), (3,1), (2,1,1), (1,2,1), (2,2,1), (3,1,1), (1,3,1), (3,2,1), (2,3,1) or (3,3,1), where the number of figures in one set of brackets represents the number of particle size fractions, the particle size fractions are arranged from left to right in the brackets in product flow sequence, and the numerical values themselves represent the number of successive screen fractions which are combined to give the particular particle size fraction.

In a preferred embodiment of the present invention, at least two screen fractions obtained in succession in product flow direction are combined to give one particle size fraction, and the mesh sizes of the screens on which these screen fractions are obtained differ preferably by in each case typically at least 50 µm, preferably by in each case at least 100 µm, preferably by in each case at least 150 µm, more preferably by in each case at least 200 µm, most preferably by in each case at least 250 µm.

In a further preferred embodiment of the present invention, the at least two screen fractions obtained first in product flow direction are combined to give one particle size fraction, and the mesh sizes of the screens on which these screen fractions are obtained differ preferably by in each case at least 250 µm, preferably by in each case at least 500 µm, more preferably by in each case at least 750 µm, most preferably by in each case at least 1000 µm.

During the classification, the superabsorbent polymer particles preferably have a temperature of from 40 to 120° C., more preferably from 45 to 100° C., most preferably from 50 to 80° C.

The classification process of the invention is particularly advantageously performed continuously. The throughput of superabsorbent polymer particles is preferably at least 150 kg/m²·h, more preferably at least 250 kg/m²·h, most preferably at least 300 kg/m²·h.

The superabsorbent polymer particles are preferably flowed over with a gas stream, more preferably air, during the classification. The gas rate is typically from 0.1 to 10 m³/h per m² of screen area, preferably from 0.5 to 5 m³/h per m² of screen area, more preferably from 1 to 3 m³/h per m² of screen area, the gas volume being measured under standard conditions (25° C. and 1 bar). The gas stream is more preferably heated before entry into the screen machine, preferably to a temperature of from 40 to 120° C., more preferably to a temperature of from 60 to 100° C., most preferably to a temperature of from 70 to 80° C. The water content of the gas stream is preferably less than 5 g/kg, more preferably less than 3.5 g/kg, most preferably less than 3 g/kg. A gas stream with low water content can be obtained, for example, by condensing an appropriate amount of water out of a gas stream with relatively high water content by cooling.

In a preferred embodiment of the present invention, a plurality of screen machines is operating in parallel.

In a more preferred embodiment of the present invention, screen machines are partly or wholly thermally insulated.

In a most preferred embodiment of the present invention, the screens have guide devices that deflect the superabsorbent polymer particles in the direction of the middle of the screen or in a spiral path toward the exit orifice of the screen. Advantageously, the screens have guide devices of both types. The exit orifice of the screen is at the screen edge. The polymer particles which do not pass through the mesh of the screen are withdrawn via the exit orifice.

The screen machines are typically electrically grounded.

The production of the superabsorbent polymer particles is described in detail hereinafter:

The superabsorbent polymer particles may be produced by polymerizing a monomer solution or suspension, comprising a) at least one ethylenically unsaturated monomer which bears acid groups and may be at least partly neutralized,
b) at least one crosslinker,
c) at least one initiator,
d) optionally one or more ethylenically unsaturated monomers copolymerizable with the monomers mentioned under a) and
e) optionally one or more water-soluble polymers, and are typically water-insoluble.

The monomers a) are preferably water-soluble, i.e. the solubility in water at 23° C. is typically at least 1 g/100 g of water, preferably at least 5 g/100 g of water, more preferably at least 25 g/100 g of water and most preferably at least 35 g/100 g of water.

Suitable monomers a) are, for example, ethylenically unsaturated carboxylic acids, such as acrylic acid, methacrylic acid and itaconic acid. Particularly preferred monomers are acrylic acid and methacrylic acid. Very particular preference is given to acrylic acid.

Further suitable monomers a) are, for example, ethylenically unsaturated sulfonic acids, such as styrenesulfonic acid and 2-acrylamido-2-methylpropanesulfonic acid (AMPS).

Impurities can have a considerable influence on the polymerization. The raw materials used should therefore have a high and constant purity. It is therefore often advantageous to specially purify the monomers a). Suitable purification processes are described, for example, in WO 2002/055469 A1, WO 2003/078378 A1 and WO 2004/035514 A1. A suitable monomer a) is, for example, acrylic acid purified according to WO 2004/035514 A1 and comprising 99.8460% by weight of acrylic acid, 0.0950% by weight of acetic acid, 0.0332% by weight of water, 0.0203% by weight of propionic acid, 0.0001% by weight of furfurals, 0.0001% by weight of maleic anhydride, 0.0003% by weight of diacrylic acid and 0.0050% by weight of hydroquinone monomethyl ether.

The proportion of acrylic acid and/or salts thereof in the total amounts of monomers a) is preferably at least 50 mol %, more preferably at least 90 mol %, most preferably at least 95 mol %.

The monomers a) typically comprise polymerization inhibitors, preferably hydroquinone monoethers, as storage stabilizers.

The monomer solution comprises preferably up to 250 ppm by weight, preferably at most 130 ppm by weight, more preferably at most 70 ppm by weight, and preferably at least 10 ppm by weight, more preferably at least 30 ppm by weight and especially around 50 ppm by weight, of hydroquinone monoether, based in each case on the unneutralized monomer a). For example, the monomer solution can be prepared by using an ethylenically unsaturated monomer bearing acid groups with an appropriate content of hydroquinone monoether.

Preferred hydroquinone monoethers are hydroquinone monomethyl ether (MEHQ) and/or alpha-tocopherol (vitamin E).

Suitable crosslinkers b) are compounds having at least two groups suitable for crosslinking. Such groups are, for example, ethylenically unsaturated groups which can be polymerized free-radically into the polymer chain, and functional groups which can form covalent bonds with the acid groups of the monomer a). In addition, polyvalent metal salts which can form coordinate bonds with at least two acid groups of the monomer a) are also suitable as crosslinkers b).

Crosslinkers b) are preferably compounds having at least two polymerizable groups which can be polymerized free-radically into the polymer network. Suitable crosslinkers b) are, for example, ethylene glycol dimethacrylate, diethylene glycol diacrylate, polyethylene glycol diacrylate, allyl methacrylate, trimethylolpropane triacrylate, triallylamine, tetraallylammonium chloride, tetraallyloxyethane, as described in EP 0 530 438 A1, di- and triacrylates, as described in EP 0 547 847 A1, EP 0 559 476 A1, EP 0 632 068 A1, WO 93/21237 A1, WO 2003/104299 A1, WO 2003/104300 A1, WO 2003/104301 A1 and DE 103 31 450 A1, mixed acrylates which, as well as acrylate groups, comprise further ethylenically unsaturated groups, as described in DE 103 31 456 A1 and DE 103 55 401 A1, or crosslinker mixtures, as described, for example, in DE 195 43 368 A1, DE 196 46 484 A1, WO 90/15830 A1 and WO 2002/032962 A2.

Preferred crosslinkers b) are pentaerythrityl triallyl ether, tetraallyloxyethane, methylenebismethacrylamide, 15-tuply ethoxylated trimethylolpropane triacrylate, polyethylene glycol diacrylate, trimethylolpropane triacrylate and triallylamine.

Very particularly preferred crosslinkers b) are the polyethoxylated and/or -propoxylated glycerols which have been esterified with acrylic acid or methacrylic acid to give di- or triacrylates, as described, for example, in WO 2003/104301 A1. Di- and/or triacrylates of 3- to 10-tuply ethoxylated glycerol are particularly advantageous. Very particular preference is given to di- or triacrylates of 1- to 5-tuply ethoxylated and/or propoxylated glycerol. Most preferred are the triacrylates of 3- to 5-tuply ethoxylated and/or propoxylated glycerol, especially the triacrylate of 3-tuply ethoxylated glycerol.

The amount of crosslinker b) is preferably 0.05 to 1.5% by weight, more preferably 0.1 to 1% by weight and most preferably 0.2 to 0.6% by weight, based in each case on monomer a). With rising crosslinker content, the centrifuge retention capacity (CRC) falls and the absorption under a pressure of 21.0 g/cm$^2$ passes through a maximum.

The initiators c) used may be all compounds which generate free radicals under the polymerization conditions, for example thermal initiators, redox initiators, photoinitiators. Suitable redox initiators are sodium peroxodisulfate/ascorbic acid, hydrogen peroxide/ascorbic acid, sodium peroxodisulfate/sodium bisulfite and hydrogen peroxide/sodium bisulfite. Preference is given to using mixtures of thermal initiators and redox initiators, such as sodium peroxodisulfate/hydrogen peroxide/ascorbic acid. However, the reducing component used is preferably disodium 2-hydroxy-2-sulfonatoacetate or a mixture of disodium 2-hydroxy-2-sulfinatoacetate, disodium 2-hydroxy-2-sulfonatoacetate and sodium bisulfite. Such mixtures are obtainable as Bruggolite® FF6 and Bruggolite® FF7 (Bruggemann Chemicals; Heilbronn; Germany).

Ethylenically unsaturated monomers d) copolymerizable with the ethylenically unsaturated monomers a) bearing acid groups are, for example, acrylamide, methacrylamide, hydroxyethyl acrylate, hydroxyethyl methacrylate, dimethylaminoethyl methacrylate, dimethylaminoethyl acrylate, dimethylaminopropyl acrylate, diethylaminopropyl acrylate, dimethylaminoethyl methacrylate, diethylaminoethyl methacrylate.

The water-soluble polymers e) used may be polyvinyl alcohol, polyvinylpyrrolidone, starch, starch derivatives, modified cellulose, such as methylcellulose or hydroxyethylcellulose, gelatin, polyglycols or polyacrylic acids, preferably starch, starch derivatives and modified cellulose.

Typically, an aqueous monomer solution is used. The water content of the monomer solution is preferably from 40 to 75% by weight, more preferably from 45 to 70% by weight and most preferably from 50 to 65% by weight. It is also possible to use monomer suspensions, i.e. monomer solutions with excess monomer a), for example sodium acrylate. With rising water content, the energy requirement in the subsequent drying rises, and, with falling water content, the heat of polymerization can only be removed inadequately.

For optimal action, the preferred polymerization inhibitors require dissolved oxygen. The monomer solution can therefore be freed of dissolved oxygen before the polymerization by inertization, i.e. flowing an inert gas through, preferably nitrogen or carbon dioxide. The oxygen content of the monomer solution is preferably lowered before the polymerization to less than 1 ppm by weight, more preferably to less than 0.5 ppm by weight, most preferably to less than 0.1 ppm by weight.

For better control of the polymerization reaction, it is optionally possible to add all known chelating agents to the monomer solution or suspension or to the raw materials thereof. Suitable chelating agents are, for example, phosphoric acid, diphosphoric acid, triphosphoric acid, polyphosphoric acid, citric acid, tartaric acid, or salts thereof.

Further suitable examples are iminodiacetic acid, hydroxyethyliminodiacetic acid, nitrilotriacetic acid, nitrilotripropionic acid, ethylenediaminetetraacetic acid, diethylenetriaminepentaacetic acid, triethylenetetraaminehexaacetic acid, N,N-bis(2-hydroxyethyl)glycine and trans-1,2-diaminocyclohexanetetraacetic acid, and salts thereof. The amount used is typically 1 to 30 000 ppm based on the monomers a), preferably 10 to 1000 ppm, preferentially 20 to 600 ppm, more preferably 50 to 400 ppm, most preferably 100 to 300 ppm.

The monomer solution or suspension is polymerized. Suitable reactors are, for example, kneading reactors or belt reactors. In the kneader, the polymer gel formed in the polymerization of an aqueous monomer solution or suspension is comminuted continuously by, for example, contrarotatory stirrer shafts, as described in WO 2001/038402 A1. Polymerization on the belt is described, for example, in DE 38 25 366 A1 and U.S. Pat. No. 6,241,928. Polymerization in a belt reactor forms a polymer gel which is comminuted in a further process step, for example in an extruder or kneader.

To improve the drying properties, the comminuted polymer gel obtained by means of a kneader can additionally be extruded.

However, it is also possible to dropletize an aqueous monomer solution and to polymerize the droplets obtained in a heated carrier gas stream. It is possible here to combine the process steps of polymerization and drying, as described in WO 2008/040715 A2 and WO 2008/052971 A1.

The acid groups of the resulting polymer gels have typically been partially neutralized. Neutralization is preferably carried out at the monomer stage. This is typically accomplished by mixing in the neutralizing agent as a solid or preferably as an aqueous solution. The degree of neutralization is preferably from 50 to 90 mol %, more preferably from 60 to 85 mol % and most preferably from 65 to 80 mol %, for which the customary neutralizing agents can be used, preferably alkali metal hydroxides, alkali metal oxides, alkali metal carbonates or alkali metal hydrogencarbonates and mixtures thereof. Instead of alkali metal salts, it is also possible to use ammonium salts. Particularly preferred alkali metals are sodium and potassium, but very particular preference is given to sodium hydroxide, sodium carbonate or sodium hydrogencarbonate and mixtures thereof.

However, it is also possible to carry out neutralization after the polymerization, at the stage of the polymer gel formed in the polymerization. It is also possible to neutralize up to 40 mol %, preferably from 10 to 30 mol % and more preferably from 15 to 25 mol % of the acid groups before the polymerization by adding a portion of the neutralizing agent to the monomer solution and setting the desired final degree of neutralization only after the polymerization, at the polymer gel stage. When the polymer gel is neutralized at least partly after the polymerization, the polymer gel is preferably comminuted mechanically, for example by means of an extruder, in which case the neutralizing agent can be sprayed, sprinkled or poured on and then carefully mixed in. To this end, the gel mass obtained can be repeatedly extruded for homogenization.

The resulting polymer gel is dried. The driers are not subject to any restriction. However, the drying of the polymer gel is preferably performed with a belt drier until the residual moisture content is preferably 0.5 to 10% by weight, more preferably 1 to 7% by weight and most preferably 2 to 5% by weight, the residual moisture content being determined by EDANA recommended test method No. NWSP 230.0.R2 (15) "Estimation of the Moisture Content as Weight Loss Upon Heating". In the case of a too high residual moisture content, the dried polymer gel has a too low glass transition temperature $T_g$ and can be processed further only with difficulty. In the case of a too low residual moisture content, the dried polymer gel is too brittle and, in the subsequent grinding steps, undesirably large amounts of polymer particles with an excessively low particle size are obtained ("fines"). The solids content of the gel before the drying is preferably from 25 to 90% by weight, more preferably from 35 to 70% by weight and most preferably from 40 to 60% by weight. However, a fluidized bed drier or a paddle drier may optionally also be used for drying purposes.

Subsequently, the dried polymer gel is ground and classified. The apparatus used for grinding may typically be single- or multistage roll mills, preferably two- or three-stage roll mills, pin mills, hammer mills or vibratory mills.

The mean particle size of the polymer particles removed as the product fraction is preferably at least 200 µm, more preferably from 250 to 600 µm and very particularly from 300 to 500 µm. The mean particle size of the product fraction may be determined by means of EDANA recommended test method No. NWSP 220.0.R2 (15) "Determination of the Particle Size Distribution by Sieve Fractionation", where the proportions by mass of the screen fractions are plotted in cumulated form and the mean particle size is determined graphically. The mean particle size here is the value of the mesh size which gives rise to a cumulative 50% by weight.

The proportion of particles with a particle size of at least 150 µm is preferably at least 90% by weight, more preferably at least 95% by weight, most preferably at least 98% by weight.

Polymer particles with a too small particle size lower e.g. the saline flow conductivity (SFC). The proportion of excessively small polymer particles ("fines") should therefore be low.

Excessively small polymer particles are therefore typically removed and recycled into the process. This is preferably done before, during or immediately after the polymerization, i.e. before the drying of the polymer gel. The excessively small polymer particles can be moistened with water and/or aqueous surfactant before or during the recycling.

It is also possible to remove excessively small polymer particles in later process steps, for example after the surface postcrosslinking or another coating step. In this case, the excessively small polymer particles recycled are surface postcrosslinked or coated in another way, for example with fumed silica.

When a kneading reactor is used for polymerization, the excessively small polymer particles are preferably added during the last third of the polymerization.

When the excessively small polymer particles are added at a very early stage, for example to the monomer solution, this lowers the centrifuge retention capacity (CRC) of the resulting superabsorbent polymer particles. However, this can be compensated, for example, by adjusting the amount of crosslinker b) used.

The proportion of particles having a particle size of at most 850 µm is preferably at least 90% by weight, more preferably at least 95% by weight, most preferably at least 98% by weight.

The proportion of particles having a particle size of at most 600 µm is preferably at least 90% by weight, more preferably at least 95% by weight, most preferably at least 98% by weight.

Polymer particles of excessively large particle size lower the free swell rate. The proportion of excessively large polymer particles should therefore likewise be small.

Excessively large polymer particles are therefore typically removed and recycled into the grinding of the dried polymer gel.

To improve the properties, the polymer particles may subsequently be thermally surface postcrosslinked. Suitable surface postcrosslinkers are compounds which comprise groups which can form covalent bonds with at least two acid groups of the polymer particles. Suitable compounds are, for example, polyfunctional amines, polyfunctional amido amines, polyfunctional epoxides, as described in EP 0 083 022 A2, EP 0 543 303 A1 and EP 0 937 736 A2, di- or polyfunctional alcohols, as described in DE 33 14 019 A1, DE 35 23 617 A1 and EP 0 450 922 A2, or β-hydroxyalkylamides, as described in DE 102 04 938 A1 and U.S. Pat. No. 6,239,230.

Additionally described as suitable surface postcrosslinkers are cyclic carbonates in DE 40 20 780 C1, 2-oxazolidinone and derivatives thereof, such as 2-hydroxyethyl-2-oxazolidinone, in DE 198 07 502 A1, bis- and poly-2-oxazolidinones in DE 198 07 992 C1, 2-oxotetrahydro-1,3-oxazine and derivatives thereof in DE 198 54 573 A1, N-acyl-2-oxazolidinones in DE 198 54 574 A1, cyclic ureas in DE 102 04 937 A1, bicyclic amide acetals in DE 103 34 584 A1, oxetanes and cyclic ureas in EP 1 199 327 A2 and morpholine-2,3-dione and derivatives thereof in WO 2003/031482 A1.

Preferred surface postcrosslinkers are ethylene carbonate, ethylene glycol diglycidyl ether, reaction products of polyamides with epichlorohydrin and mixtures of propylene glycol and 1,4-butanediol.

Very particularly preferred surface postcrosslinkers are 2-hydroxyethyloxazolidin-2-one, oxazolidin-2-one and 1,3-propanediol.

In addition, it is also possible to use surface postcrosslinkers which comprise additional polymerizable ethylenically unsaturated groups, as described in DE 37 13 601 A1.

The amount of surface postcrosslinker is preferably 0.001 to 2% by weight, more preferably 0.02 to 1% by weight and most preferably 0.05 to 0.2% by weight, based in each case on the polymer particles.

In a preferred embodiment of the present invention, polyvalent cations are applied to the particle surface in addition to the surface postcrosslinkers before, during or after the surface postcrosslinking.

The polyvalent cations usable in the process of the invention are, for example, divalent cations such as the cations of zinc, magnesium, calcium, iron and strontium, trivalent cations such as the cations of aluminum, iron, chromium, rare earths and manganese, tetravalent cations such as the cations of titanium and zirconium. Possible counterions are chloride, bromide, sulfate, hydrogensulfate, carbonate, hydrogencarbonate, nitrate, phosphate, hydrogenphosphate, dihydrogenphosphate and carboxylate, such as acetate and lactate. Aluminum sulfate and aluminum lactate are preferred. Apart from metal salts, it is also possible to use polyamines as polyvalent cations.

The amount of polyvalent cation used is, for example, 0.001 to 1.5% by weight, preferably 0.005 to 1% by weight and more preferably 0.02 to 0.8% by weight, based in each case on the polymer particles.

The surface postcrosslinking is typically performed in such a way that a solution of the surface postcrosslinker is sprayed onto the dried polymer particles. After the spray application, the polymer particles coated with surface postcrosslinker are dried thermally, and the surface postcrosslinking reaction can take place either before or during the drying.

The spray application of a solution of the surface postcrosslinker is preferably performed in mixers with moving mixing tools, such as screw mixers, disk mixers and paddle mixers. Preference is given to horizontal mixers such as paddle mixers, very particular preference to vertical mixers. The distinction between horizontal mixers and vertical mixers is made by the position of the mixing shaft, i.e. horizontal mixers have a horizontally mounted mixing shaft and vertical mixers a vertically mounted mixing shaft. Suitable mixers are, for example, horizontal Pflugschar® plowshare mixers (Gebr. Lödige Maschinenbau GmbH; Paderborn; Germany), Vrieco-Nauta continuous mixers (Hosokawa Micron BV; Doetinchem; the Netherlands), Processall Mixmill mixers (Processall Incorporated; Cincinnati; USA) and Schugi Flexomix® (Hosokawa Micron BV; Doetinchem; the Netherlands). However, it is also possible to spray on the surface postcrosslinker solution in a fluidized bed.

The surface postcrosslinkers are typically used in the form of an aqueous solution. The penetration depth of the surface postcrosslinker into the polymer particles can be adjusted via the content of nonaqueous solvent and total amount of solvent.

When exclusively water is used as the solvent, a surfactant is advantageously added. This improves the wetting behavior and reduces the tendency to form lumps. However, preference is given to using solvent mixtures, for example isopropanol/water, 1,3-propanediol/water and propylene glycol/water, where the mixing ratio in terms of mass is preferably from 20:80 to 40:60.

The thermal surface postcrosslinking is preferably performed in contact driers, more preferably paddle driers, most preferably disk driers. Suitable driers are, for example, Hosokawa Bepex® Horizontal Paddle Dryer (Hosokawa Micron GmbH; Leingarten; Germany), Hosokawa Bepex® Disc Dryer (Hosokawa Micron GmbH; Leingarten; Germany) and Nara Paddle Dryer (NARA Machinery Europe; Frechen; Germany). Moreover, fluidized bed driers may also be used.

The thermal surface postcrosslinking can be effected in the mixer itself, by heating the jacket or blowing in warm air. Equally suitable is a downstream drier, for example a shelf drier, a rotary tube oven or a heatable screw. It is particularly advantageous to effect mixing and drying in a fluidized bed drier.

Preferred surface postcrosslinking temperatures are in the range of 100 to 250° C., preferably 120 to 220° C., more preferably 130 to 210° C. and most preferably 150 to 200° C. The preferred residence time at this temperature in the reaction mixer or drier is preferably at least 10 minutes, more preferably at least 20 minutes, most preferably at least 30 minutes, and typically at most 60 minutes.

Subsequently, the surface postcrosslinked polymer particles can be classified again, excessively small and/or excessively large polymer particles being removed and recycled into the process.

To further improve the properties, the surface postcrosslinked polymer particles can be coated or remoisturized.

The remoisturizing is preferably performed at 30 to 80° C., more preferably at 35 to 70° C., most preferably at 40 to 60° C. At excessively low temperatures, the superabsorbent polymer particles tend to form lumps, and, at higher temperatures, water already evaporates to a noticeable degree. The amount of water used for remoisturizing is preferably from 1 to 10% by weight, more preferably from 2 to 8% by weight and most preferably from 3 to 5% by weight. The remoisturizing increases the mechanical stability of the polymer particles and reduces their tendency to static charging.

Suitable coatings for improving the free swell rate and the saline flow conductivity (SFC) are, for example, inorganic inert substances, such as water-insoluble metal salts, organic polymers, cationic polymers and di- or polyvalent metal cations. Suitable coatings for dust binding are, for example, polyols. Suitable coatings for counteracting the undesired caking tendency of the polymer particles are, for example, fumed silica, such as Aerosil® 200, and surfactants, such as Span® 20.

The superabsorbent polymer particles produced by the process of the invention have a centrifuge retention capacity (CRC) of typically at least 15 g/g, preferably at least 20 g/g, more preferably at least 22 g/g, especially preferably at least 24 g/g and most preferably at least 26 g/g. The centrifuge retention capacity (CRC) of the superabsorbent polymer particles is typically less than 60 g/g. The centrifuge retention capacity (CRC) is determined by EDANA recommended test method No. NWSP 241.0.R2 (15)"Determination of the Fluid Retention Capacity in Saline Solution by Gravimetric Measurement Following Centrifugation".

The superabsorbent polymer particles produced by the process of the invention have an absorption under high load (AUHL) of typically at least 15 g/g, preferably at least 20 g/g, more preferably at least 22 g/g, especially preferably at least 24 g/g and most preferably at least 26 g/g. The absorption under high load (AUHL) of the superabsorbent polymer particles is typically less than 35 g/g. The absorption under high load (AUHL) is determined by EDANA recommended test method No. NWSP 242.0.R2 (15) "Gravimetric Determination of Absorption Against Pressure" and a pressure of 49.2 g/cm$^2$.

EXAMPLES

Example 1

Comparative Example

By continuously mixing deionized water, 50% by weight sodium hydroxide solution and acrylic acid, an acrylic acid/sodium acrylate solution was prepared, such that the degree of neutralization corresponds to 71.3 mol %. The solids content of the monomer solution was 38.8% by weight.

The polyethylenically unsaturated crosslinker used was polyethylene glycol-400 diacrylate (di-acrylate proceeding from a polyethylene glycol with a mean molar mass of 400 g/mol). The amount used was 2 kg of crosslinker per t of monomer solution.

To initiate the free-radical polymerization, 1.03 kg of a 0.25% by weight aqueous hydrogen peroxide solution, 3.10 kg of a 15% by weight aqueous sodium peroxodisulfate solution and 1.05 kg of a 1% by weight aqueous ascorbic acid solution were used per t of monomer solution.

The throughput of the monomer solution was 20 t/h. The reaction solution had a temperature of 23.5° C. at the feed. The monomer solution was polymerized in a List Contikneter continuous kneader reactor with a capacity of 6.3 m$^3$ (LIST AG, Arisdorf, Switzerland).

Polyethylene glycol-400 diacrylate is continuously added to the monomer solution followed by addition of mixture of hydrogen peroxide solution and sodium peroxodisulfate solution. Ascorbic acid solution is separately continuously added to the kneader reactor.

Between the addition point for the crosslinker and the addition sites for the initiators, the monomer solution was inertized with nitrogen.

After approx. 50% of the residence time, a metered addition of fines (1000 kg/h), which were obtained from the production process by grinding and screening, to the reactor additionally took place. The residence time of the reaction mixture in the reactor was 15 minutes.

The resulting polymer gel was placed onto a belt dryer. On the belt dryer, an air/gas mixture flowed continuously around the polymer gel and dried it.

The dried polymer gel was ground and a 500 g-sample was screened by using a screen machine of type KS 1000 (Retsch GmbH, Haan, Germany) having four screen decks (1,000 µm, 850 µm, 300 µm, and 90 µm). The pressure above the uppermost sieve was below ambient pressure. The pressure above the uppermost sieve was 200 mbar (50 mbar per sieve) higher than the pressure below the undermost sieve. The pressure difference was kept constant during screening. The amount of polymer on the sieves after 1 minute sieving time at the end of the screening is recorded in table 1.

The polymers on the 90 µm sieve and on the 300 µm sieve were combined. The 90 to 850 µm sieve cut was analyzed analogous to the EDANA recommended test method No. NWSP 220.0.R2 (15) "Determination of the Particle Size Distribution by Sieve Fractionation" using six screen decks (850 µm, 600 µm, 300 µm, 150 µm, 106 µm, and 45 µm). The results are recorded in table 2.

Example 2

Comparative Example

Example 1 was repeated, except that the pressure above the uppermost sieve was 20 mbar (5 mbar per sieve) higher than the pressure below the undermost sieve.

Example 3

Example 1 was repeated, except that the pressure above the uppermost sieve was 8 mbar (2 mbar per sieve) higher than the pressure below the undermost sieve.

Example 4

Example 1 was repeated, except that the pressure above the uppermost sieve was the same as the pressure below the undermost sieve.

Example 5

Comparative Example

Example 1 was repeated, except that the pressure above the uppermost sieve was 2 mbar (0.5 mbar per sieve) lower than the pressure below the undermost sieve.

TABLE 1 particle size fractions

| Pressure difference per sieve | Example | | | | |
|---|---|---|---|---|---|
| | 1*) −50 mbar | 2*) −5 mbar | 3 −2 mbar | 4 0 mbar | 5*) +0.5 mbar |
| >1000 μm | 2.3 | 2.1 | 2.2 | 2.1 | 2.2 |
| 850-1000 μm | 3.6 | 3.6 | 3.6 | 3.6 | 3.5 |
| 300-850 μm | 93.5 | 69.2 | 69.2 | 69.2 | 69.1 |
| 90-300 μm | 0.5 | 25.0 | 20.1 | 20.1 | 22.7 |
| <90 μm | 0.0 | 0.0 | 5.0 | 4.9 | 2.5 |

*)comparative

TABLE 2 particle size distributions of 90 to 850 μm sieve cut

| Pressure difference per sieve | Example | | | | |
|---|---|---|---|---|---|
| | 1*) −50 mbar | 2*) −5 mbar | 3 −2 mbar | 4 0 mbar | 5*) +0.5 mbar |
| >850 μm | 0.2 | 0.2 | 0.2 | 0.1 | 0.2 |
| 600-850 μm | 25.0 | 23.4 | 25.3 | 25.0 | 24.9 |
| 300-600 μm | 52.1 | 50.2 | 53.2 | 52.4 | 50.2 |
| 150-300 μm | 11.0 | 12.2 | 12.4 | 12.3 | 12.5 |
| 106-150 μm | 5.4 | 7.0 | 5.6 | 5.8 | 6.2 |
| 45-106 μm | 4.7 | 5.7 | 3.2 | 4.2 | 4.9 |
| <45 μm | 1.6 | 1.4 | 0.1 | 0.2 | 1.1 |

*)comparative

The invention claimed is:

1. A classification process for superabsorbent polymer particles, wherein the water-absorbent polymer particles are classified by using a tumbling screen machine having at least two sieves under reduced pressure and a pressure above an uppermost sieve is from 0.05 to 3.5 mbar per sieve higher than a pressure below an undermost sieve.

2. The process according to claim 1, wherein the pressure above the uppermost sieve is from 0.25 to 2.5 mbar per sieve higher than the pressure below the undermost sieve.

3. The process according to claim 1, wherein the pressure above the uppermost sieve is at least 2 mbar below ambient pressure.

4. The process according to claim 1, wherein a product fraction is removed by the at least two sieves of different mesh sizes.

5. The process according to claim 1, wherein an oversize is removed by the at least two sieves of different mesh sizes.

6. The process according to claim 1, wherein the superabsorbent polymer particles, during the classification, have a temperature of from 40 to 120° C.

7. The process according to claim 1, wherein the superabsorbent polymer particles are flowed over by a gas stream during the classification.

8. The process according to claim 7, wherein the water content of the gas stream is less than 5 g/kg.

9. The process according to claim 7, wherein the gas stream has a temperature of at least 40° C.

10. The process according to claim 7, wherein the gas stream is air.

11. The process according to claim 1, wherein the tumbling screen machine is partly or wholly thermally insulated.

12. The process according to claim 1, wherein a proportion of acrylic acid in a total amount of ethylenically unsaturated monomer in the superabsorbent polymer particles is at least 95 mol %.

13. The process according to claim 12, wherein a degree of neutralization of the ethylenically unsaturated monomer is from 65 to 80 mol %.

14. The process according to claim 12, wherein an amount of crosslinker based on the ethylenically unsaturated monomer is 0.2 to 0.6% by weight.

15. The process according to claim 1, wherein the superabsorbent polymer particles have a centrifuge retention capacity of at least 15 g/g.

16. The process according to claim 1 wherein the at least two sieves of the tumbling screen medium are arranged over one another.

17. The process according to claim 1 wherein the at least two sieves of the tumbling screen medium are arranged in parallel.

18. The new process according to claim 1 wherein the tumbling screen machine has at least 3 sieves under reduced pressure.

19. The new process according to claim 1 wherein the tumbling screen machine has at least 4 sieves under reduced pressure.

20. The process according to claim 1 wherein the tumbling screen machine has as guide device deflecting the superabsorbent polymer particles to an exit orifice of each of the at least two sieves.

* * * * *